(12) United States Patent
Kraemer

(10) Patent No.: US 8,763,646 B2
(45) Date of Patent: Jul. 1, 2014

(54) FUEL TANK WITH CONNECTED FUNCTIONAL COMPONENTS

(75) Inventor: Timo Kraemer, Rott (DE)

(73) Assignee: Kautex Textron GmbH & Co. KG, Bonn (DE)

( * ) Notice: Subject to any disclaimer, the term of this patent is extended or adjusted under 35 U.S.C. 154(b) by 741 days.

(21) Appl. No.: 12/206,607

(22) Filed: Sep. 8, 2008

(65) Prior Publication Data

US 2009/0065513 A1    Mar. 12, 2009

(30) Foreign Application Priority Data

Sep. 6, 2007 (DE) .................. 10 2007 042 278

(51) Int. Cl.
| | |
|---|---|
| F16L 11/08 | (2006.01) |
| F16L 11/12 | (2006.01) |
| F16L 9/22 | (2006.01) |
| F16K 24/04 | (2006.01) |

(52) U.S. Cl.
USPC ......... 138/119; 138/120; 220/4.13; 220/4.14; 137/202

(58) Field of Classification Search
USPC ............ 137/587–592, 202; 138/118, 121, 26, 138/28, 30, 103, 106–109, 120, 123–126, 138/155, 172–174, 177; 220/86.2, 89.1, 220/562–564, 601, 746, 913, 4.12–4.15, 220/86.1–86.3, 905; 285/223–229
See application file for complete search history.

(56) References Cited

U.S. PATENT DOCUMENTS

| | | | | | |
|---|---|---|---|---|---|
| 398,526 | A | * | 2/1889 | McCloskey | 60/531 |
| 700,378 | A | * | 5/1902 | Schmidt | 285/64 |
| 3,060,069 | A | * | 10/1962 | Sindars | 138/120 |
| 3,586,058 | A | * | 6/1971 | Ahrens et al. | 138/103 |
| 3,749,124 | A | * | 7/1973 | Andres | 137/587 |
| 3,838,713 | A | * | 10/1974 | Tubbs | 138/109 |
| 3,847,184 | A | * | 11/1974 | God | 138/120 |
| 3,963,055 | A | * | 6/1976 | DeRosa | 138/140 |
| 4,144,632 | A | * | 3/1979 | Stroupe | 29/469.5 |
| 4,261,477 | A | * | 4/1981 | Casimir et al. | 220/746 |
| 4,662,404 | A | * | 5/1987 | LeVeen et al. | 138/120 |
| 4,799,509 | A | * | 1/1989 | Wawra et al. | 137/587 |
| 4,951,699 | A | * | 8/1990 | Lipman | 137/142 |
| 5,078,169 | A | * | 1/1992 | Scheurenbrand et al. | 137/574 |
| 5,195,784 | A | * | 3/1993 | Richter | 285/61 |
| 5,343,902 | A | * | 9/1994 | Ramioulle | 141/7 |
| 5,476,080 | A | * | 12/1995 | Brunnhofer | 123/468 |

(Continued)

FOREIGN PATENT DOCUMENTS

| | | | | |
|---|---|---|---|---|
| WO | 0130601 | | 5/2001 | |
| WO | WO 2006095024 A1 | * | 9/2006 | B29C 49/20 |

*Primary Examiner* — Anthony Stashick
*Assistant Examiner* — Ned A Walker
(74) *Attorney, Agent, or Firm* — Grossman Tucker Perreault & Pfleger, PLLC

(57) ABSTRACT

Functional components which are stationarily mounted in a fuel tank and connected together by way of a connecting line can be damaged by a change in size and shape of the fuel tank. The invention concerns a fuel tank, in particular of thermoplastic material, comprising at least two functional components such as for example venting valves, pumps, containers or the like, which are stationarily arranged in a fuel tank and which are connected together by way of a connecting line. To avoid damage, in accordance with the invention one connecting line includes at least a first portion and a second portion, wherein the stiffness of the first portion is less than the stiffness of the second portion.

8 Claims, 3 Drawing Sheets

(56) References Cited

U.S. PATENT DOCUMENTS

Figure 1:
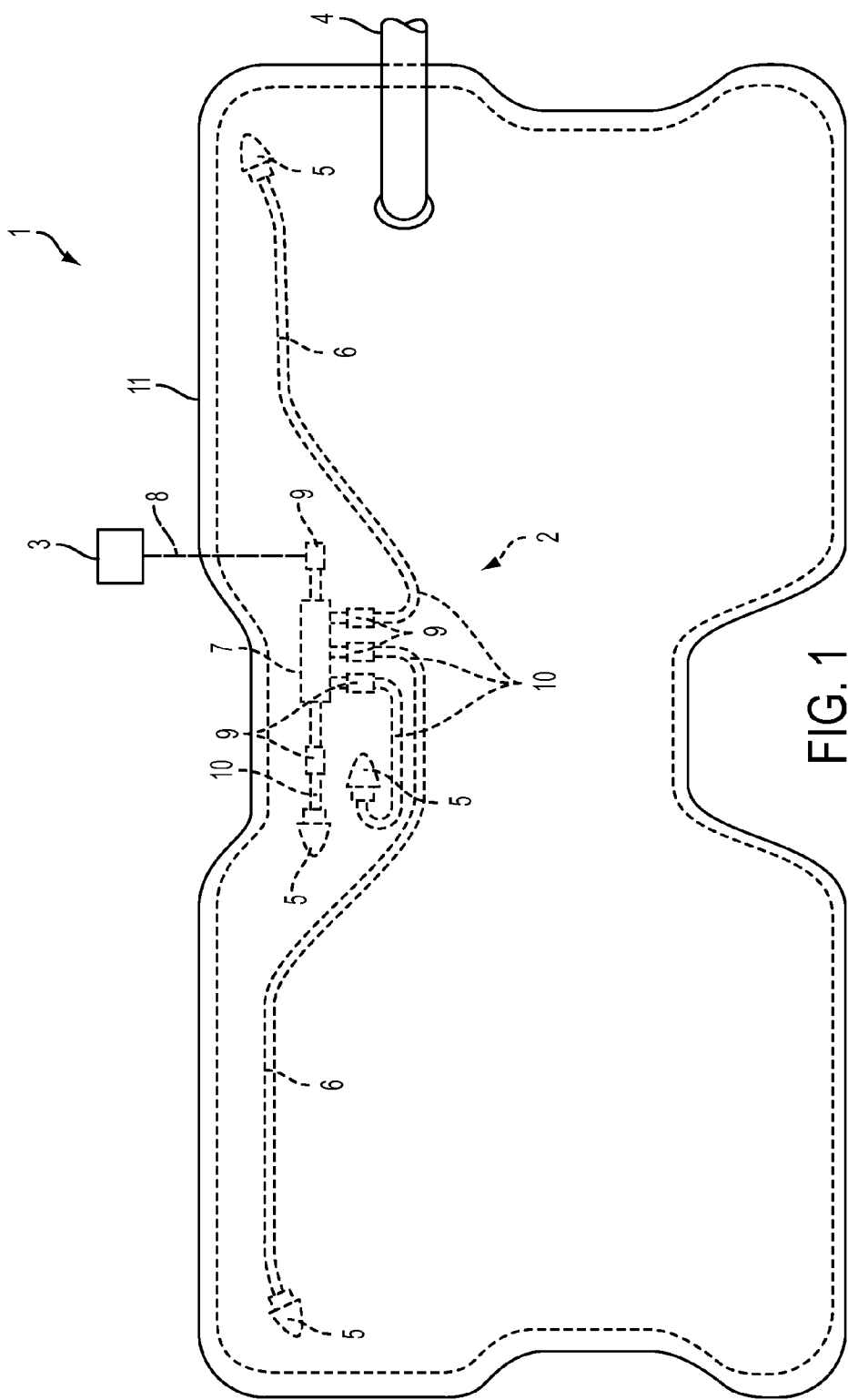

| Patent No. | | Date | Inventor | Class |
|---|---|---|---|---|
| 5,622,757 | A * | 4/1997 | Murakami et al. | 428/36.91 |
| 5,776,570 | A * | 7/1998 | Murakami et al. | 428/36.8 |
| 5,792,532 | A * | 8/1998 | Pfleger | 428/36.9 |
| 5,803,506 | A * | 9/1998 | Argersinger et al. | 285/14 |
| 6,016,848 | A * | 1/2000 | Egres, Jr. | 138/137 |
| 6,089,249 | A * | 7/2000 | Thibaut et al. | 137/202 |
| 6,189,510 | B1 * | 2/2001 | Jaeger et al. | 123/468 |
| 6,283,142 | B1 * | 9/2001 | Wheeler et al. | 137/265 |
| 6,302,137 | B1 * | 10/2001 | Devall | 137/202 |
| 6,422,610 | B1 * | 7/2002 | Chang | 285/298 |
| 6,604,539 | B1 * | 8/2003 | Strohmayer et al. | 137/43 |
| 6,607,005 | B2 * | 8/2003 | Viebahn et al. | 137/574 |
| 6,634,342 | B1 * | 10/2003 | Wouters et al. | 123/516 |
| 6,672,337 | B2 * | 1/2004 | Kobayashi et al. | 138/30 |
| 6,769,453 | B2 * | 8/2004 | Nishino et al. | 138/121 |
| 6,849,314 | B2 * | 2/2005 | Jing et al. | 428/36.91 |
| 7,007,675 | B2 * | 3/2006 | Ida et al. | 123/468 |
| 7,040,294 | B2 * | 5/2006 | Yagisawa et al. | 123/468 |
| 7,047,949 | B2 * | 5/2006 | Reiter et al. | 123/516 |
| 7,059,305 | B2 * | 6/2006 | Knaggs et al. | 123/509 |
| 7,143,750 | B2 * | 12/2006 | Brunel et al. | 123/509 |
| 7,147,007 | B2 * | 12/2006 | Renaud | 138/121 |
| 7,168,466 | B2 * | 1/2007 | Ganachaud et al. | 141/286 |
| 7,318,445 | B2 * | 1/2008 | Ohshiro et al. | 137/202 |
| 7,383,856 | B2 * | 6/2008 | Martiš et al. | 137/587 |
| 7,520,293 | B2 * | 4/2009 | Hilderley et al. | 137/202 |
| 7,624,761 | B2 * | 12/2009 | Arnold et al. | 138/125 |
| 8,163,228 | B2 * | 4/2012 | Criel et al. | 264/516 |
| 8,209,854 | B2 * | 7/2012 | Blieux et al. | 29/801 |
| 8,376,180 | B2 * | 2/2013 | Vulkan et al. | 220/746 |
| 2002/0083974 | A1 * | 7/2002 | Duermeier et al. | 137/202 |
| 2003/0047228 | A1 * | 3/2003 | Nishino et al. | 138/121 |
| 2003/0198769 | A1 * | 10/2003 | Jing et al. | 428/36.91 |
| 2003/0205272 | A1 * | 11/2003 | Benjey et al. | 137/202 |
| 2005/0016601 | A1 * | 1/2005 | Reiter et al. | 137/590 |
| 2005/0133096 | A1 * | 6/2005 | Brunel et al. | 137/565.17 |
| 2005/0172999 | A1 * | 8/2005 | Ohshiro et al. | 137/202 |
| 2005/0205156 | A1 * | 9/2005 | Ganachaud et al. | 141/286 |
| 2007/0089798 | A1 * | 4/2007 | Matsuo et al. | 138/118 |
| 2007/0186976 | A1 * | 8/2007 | Hilderley et al. | 137/202 |
| 2008/0224363 | A1 * | 9/2008 | Criel et al. | 264/526 |
| 2009/0166367 | A1 * | 7/2009 | Blieux et al. | 220/694 |
| 2009/0308881 | A1 * | 12/2009 | Eulitz et al. | 220/660 |
| 2009/0321461 | A1 * | 12/2009 | Vulkan et al. | 220/746 |

* cited by examiner

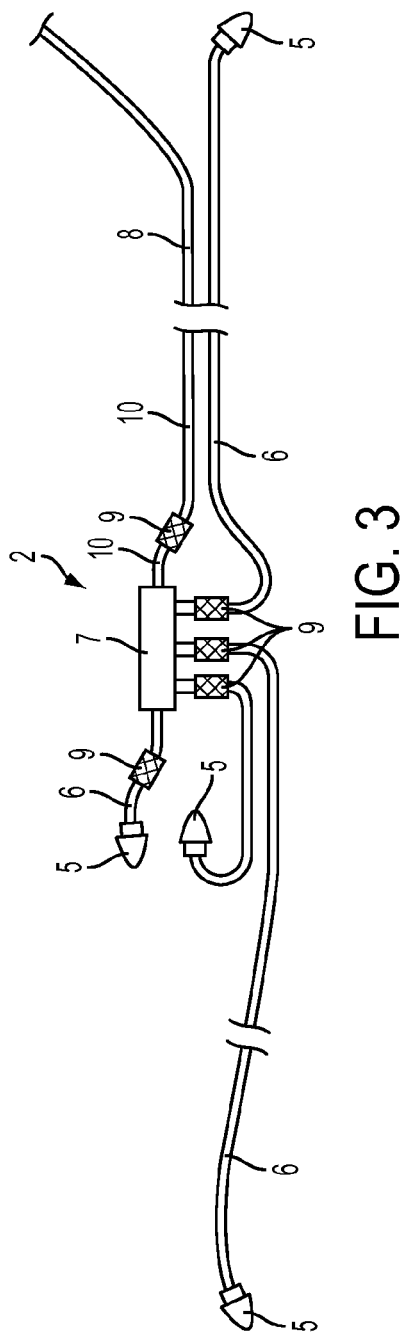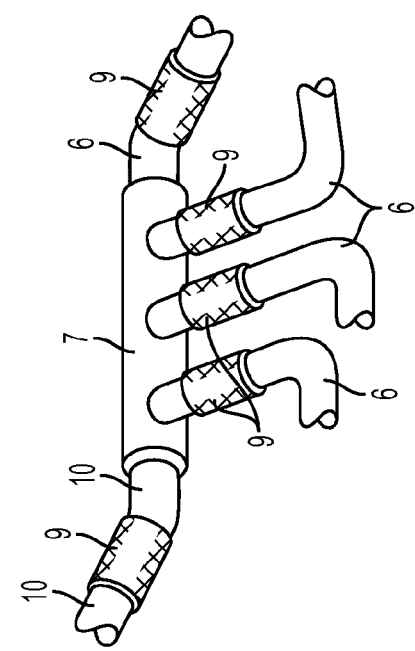

US 8,763,646 B2

FUEL TANK WITH CONNECTED FUNCTIONAL COMPONENTS

CROSS-REFERENCE TO RELATED APPLICATIONS

This application claims priority to German Application No. DE 10 2007 042 278.6, filed Sep. 6, 2007.

FIELD OF THE INVENTION

The invention concerns a fuel tank, in particular of thermoplastic material, comprising at least two functional components such as for example venting valves, pumps, containers or the like, which are stationarily arranged in the fuel tank and which are connected together by way of at least one connecting line.

BACKGROUND

WO 01/30601 A1 discloses a fuel tank of that kind, with installed functional components. In the fuel tank disclosed therein for example the compensating container or vessel and all valves for venting of the fuel tank are installed within the fuel tank. Those functional components are arranged stationarily in the fuel tank.

SUMMARY

Modern fuel tanks are generally made from plastic material, for example by extrusion blow molding. Depending on the manufacturing method involved, it is not possible to fix the functional components and the connecting line during manufacture of the fuel tanks so that the functional components and the connecting lines have to be subsequently installed in the fuel tank. That is inevitably effected through an opening in the fuel tank, such as for example an inspection opening. As openings in fuel tanks of plastic material form potential leakage paths for gaseous hydrocarbons, either they are to be avoided or they are to be kept as small as possible. The assembly of installation fitment components, in particular the assembly of venting valves, to lines which are already pre-assembled outside the tank, through a narrow opening, can cause problems.

The fuel tanks known from the state of the art vary in their size and shape within certain limits after manufacture. Thus for example a fuel tank of plastic material, after manufacture thereof, shrinks by about 3%, caused by cooling after the manufacturing process (contraction). In addition first filling of the fuel tank, and filling and emptying thereof in normal operation, lead to changes in shape and size of the fuel tank. When fuel tanks of plastic material which generally comprise a multi-layer extrudate with an inside layer of polyethylene are filled for the first time, a change in shape occurs due to swelling of the inside layer in the presence of fuel. Finally, when the fuel tank is in ordinary use in a motor vehicle, the fuel tank is subjected to stresses which at least in part cause elastic deformation of the wall thereof.

Because of the stationary arrangement of the functional components on the wall of the tank, they are generally welded or latched to the wall of the tank, and forces are exerted on the connecting lines, which are transmitted to the functional components, upon a change in shape and size of the tank. Compensation for those forces by a connecting line which is laid for example in loops is not desirable because of the siphon formation effect that it entails. As is known, condensed fuel collects in such siphons, and when that fuel is entrained in the venting conduit, it adversely affects the mode of operation of the fuel vapor filter.

If the functional components are introduced into the container during shaping thereof, but the connecting lines in contrast are only fitted after the container is finished, that gives rise to problems if the position of the fixing points, that is to say the position of the functional components, has altered for example due to shrinkage distortion. The connecting line must then already be under stress when it is fitted. Independently of that, the functional components can have been introduced into the tank with the connecting lines during manufacture of the tank. That can be effected for example in manufacture of the fuel tank by extrusion blow molding of two preforms in web form in a multi-part molding tool, for example in a three-part molding tool, by a procedure whereby the functional components are already welded with pre-assembled connecting lines, to the inside wall while it is still plastic of the half-finished product, by way of a manipulator or the like. Upon fitting the functional components in the interior of the tank after the tank is finished, they can be latched for example to fixing means provided at the inside wall of the container.

Therefore the object of the invention is to improve a fuel tank of the kind set forth in the opening part of this specification, in such a way that a change in size and shape of the fuel tank after manufacture does not lead to damage to the functional components arranged in the fuel tank.

In accordance with the invention that object is attained in that at least one connecting line includes at least a first portion and a second portion, wherein the stiffness of the first portion is less than the stiffness of the second portion. The first portion involving the lower level of stiffness is so designed that it can compensate for the forces occurring upon a change in size and shape of the fuel tank so that the force exerted by the comparatively stiff connecting lines is not transmitted to the functional components. Furthermore the connecting line can be deformed in the region of the first portion of lesser stiffness without damage, whereby installation of the connecting line in the fuel tank is facilitated as the connecting line can be more easily introduced into the tank through the inspection opening.

The term connecting line in accordance with the invention is used to denote a line arrangement comprising a plurality of line portions and/or branchings just as a single line portion connecting two parts together.

In an advantageous embodiment of the invention the first portion of lesser stiffness can comprise a fluid silicone. Fluid silicones have the advantage that they are resistant to decomposition by fuels.

The second portion of the connecting line of greater stiffness can comprise a thermoplastic material or metal.

In a further advantageous embodiment of the invention the connecting line has at least one portion of lesser stiffness which is arranged between two portions of a stiffness which is greater in relation thereto (hard-soft-hard).

The first portion of the connecting line of the lesser stiffness is preferably such that it has a Shore A hardness ≤70.

The second portion of the connecting line of the greater stiffness is preferably such that it has a Shore A hardness >70.

Depending on the respective size and shape of the fuel tank and the deformations to be expected, it is advantageous if the connecting line includes further portions, the stiffness of which is less than the stiffness of the second portion. In that way it is possible to insert portions of a lesser degree of stiffness in specifically targeted fashion at locations at which deformation is expected. Due to the damping action of those portions the functional components in the fuel tank are protected from damage caused by forces exerted by way of the connecting lines.

To impart a certain degree of stiffness to the connecting line it is advantageous if the connecting line includes further portions, the stiffness of which is greater than the stiffness of the first portion.

If the connecting line includes more than three portions it is advantageous if portions of greater and lesser stiffness alternate so that a portion of lesser stiffness is always provided between two portions of greater stiffness. Thus the portion of lesser stiffness can damp a possible movement between the two portions of greater stiffness.

On the other hand it may also be advantageous if the first portion of the lesser stiffness is disposed at an end of the connecting line. In that way the forces caused by the change in size and shape of the fuel tank are compensated. If such a connecting line is subsequently connected within the fuel tank to the functional component, the first portion involving the lesser stiffness can make that operation easier. When connecting the connecting line to the functional component the connecting line for example has to be pushed onto a connecting nipple. That is easier if the portion which has to be pushed onto the connecting nipple is of a lower level of stiffness.

So that more than two functional components can be connected together by way of a connecting line in the fuel tank, the fuel tank can include a connecting portion in the form of a distributor portion in the connecting line.

Upon a change in size and shape of the fuel tank, a force is exerted by way of the connecting line between the connecting portion and the functional component. To prevent that, it is provided in accordance with the invention that portions of differing stiffness are disposed between the connecting portion and the functional component. There is the advantage there that the force which occurs can be compensated directly between the functional component and the connecting portion and does not first have to be transmitted by way of the connecting portion to a portion of lesser stiffness.

Desirably the connecting line is connected at its respective ends to venting valves as functional components.

The first portion involving the lesser stiffness is desirably produced by fluid silicone injection molding. On the other hand it is also possible for the connecting line with portions of differing stiffness to be made in one piece by extrusion blow molding or 3D suction blow molding (hard-soft-hard).

FIGURES

Figure 2:
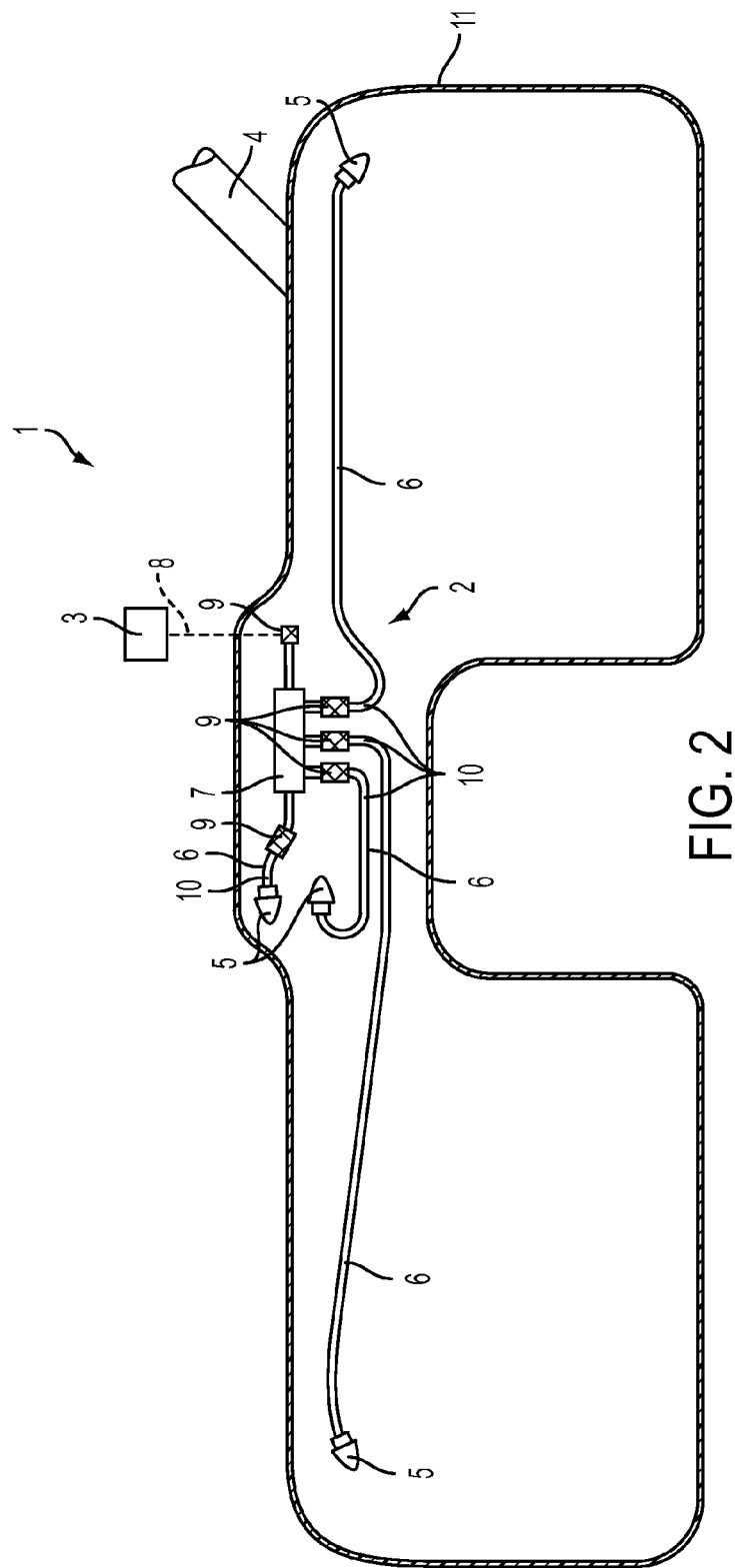

An embodiment of the invention is described hereinafter by way of example with reference to the drawing in which:

FIG. 1 shows a view from above of a fuel tank according to the invention with an installed venting arrangement shown by way of indication, FIG. 2 shows a cross-sectional view of the fuel tank of FIG. 1 with installed venting arrangement, FIG. 3 shows the venting arrangement of the fuel tank of FIG. 1 comprising four venting valves, a connecting portion and a venting line, and FIG. 4 shows the connecting portion of the venting arrangement of FIG. 3.

DETAILED DESCRIPTION

FIG. 1 shows a fuel tank 1 with a venting arrangement 2 installed therein, a fuel vapor filter 3 arranged inside or outside the fuel tank and a filling connection 4. The venting arrangement 2 comprises four venting valves 5, a connecting line 6 and a connecting portion 7. The connecting portion 7 is connected by way of a venting line 8 to the fuel vapor filter 3 which is usually in the form of an activated carbon filter.

The fuel tank 1 in the illustrated embodiment is in the form of an extrusion blow molded plastic tank. It has a multi-layer tank wall 11 with at least one barrier layer embedded therein for hydrocarbons. The fuel tank 1 encloses the usual functional components such as for example venting valves, pumps, compensating container, surge pot or the like.

A venting arrangement 2 which functions in the usual fashion ensures in normal operation and upon filling of the fuel tank 1 by way of the filling connection 4 that the gas mixture contained in the fuel tank 1 is passed to the fuel vapor filter 3 by way of the venting valves 5, the connecting line 6, the connecting portion 7 and the venting line 8. The liquid fuel goes into the gaseous phase caused by the dynamics involved in traveling movement of the vehicle and due to changes in temperature. In the situation involving an excessively high pressure in the fuel tank 1 and in a refueling operation in which the liquid displaces the gas mixture the gas mixture has to be passed out of the fuel tank 1. The gas mixture which is passed out of the fuel tank 1 is filtered by the fuel vapor filter 3 and cleaned in such a way that it can be discharged to the ambient atmosphere.

The venting arrangement 2 is either fitted into the fuel tank 1 during manufacture of the fuel tank 1 or is fitted into the fuel tank 1 subsequently through an inspection opening (not shown). Upon subsequent installation of the venting arrangement 2 in the fuel tank 1 the pre-assembled venting arrangement 2 is generally fitted into the fuel tank 1 through the inspection opening. That is problematical by virtue of the size and stiffness of the venting arrangement 2. As the venting arrangement 2 is designed for the nominal size of the fuel tank 1 but, as previously mentioned, the size and shape thereof can change, there is no guarantee in respect of fitting accuracy of the venting arrangement 2 when it is installed in the fuel tank 1, and that can also give rise to problems.

The connecting line 6 between each venting valve 5 and the connecting portion 7 respectively comprises portions of differing stiffness. Each connecting line 6 includes first portions 9 of lesser stiffness and second portions 10 of greater stiffness. The portions 9 of lesser stiffness levels can alternate with portions 10 of greater stiffness, for example in the sequence hard-soft-hard. The first portion 9 of lesser stiffness is made from a fluid silicone. The available standard types of fluid silicones have a Shore A hardness of between 20 and 70. The portion 10 is made from a thermoplastic material and is of greater stiffness.

The venting arrangement 2 comprising the four venting valves 5, the connecting line 6, the connecting portion 7 and the venting line 8 is of a self-supporting nature. In other words, the portions 9 of lesser stiffness have only a slight influence on the stiffness of the entire venting arrangement 2.

To prevent damage to the venting valves 5 by the forces occurring upon a change in size and shape, the connecting line 6 includes portions 9 of a lesser stiffness, which can compensate for the change in size of the fuel tank 1.

FIG. 2 shows a cross-sectional view of the fuel tank 1 of FIG. 1. It can be seen from the cross-sectional view that the venting arrangement 2 is disposed in the upper region of the fuel tank 1, in the position of installation of the fuel tank. That compensating volume is not filled with fuel in the fully filled condition of the fuel tank 1.

FIG. 3 shows a detail view of the venting arrangement 2 of FIGS. 1 and 2. As already mentioned hereinbefore the venting arrangement 2 includes the venting valves 5, the connecting line 6, the connecting portion 7 and the venting line 8 connecting the venting arrangement 2 to the fuel vapor filter 3.

The connecting line 6 and the venting line 8 each include a portion 9 of lesser stiffness which is so designed that it can compensate for changes in size and shape of the fuel tank 1. For that purpose the portions 9 of lesser stiffness are respectively inserted between the connecting portion 7 and the venting valve 5 or the fuel vapor filter 3, more specifically in the proximity of the connecting portion 7. That ensures that the forces which occur upon a change in size and shape can be compensated, irrespective of where they occur. If a portion 9 of lesser stiffness is arranged between each venting valve 5 and the connecting portion 7, it is possible to guarantee that the forces occurring upon a local change in size and shape of the fuel tank 1 can be compensated.

FIG. 4 shows a detail view of the connecting portion 7 and the connecting line 6 and venting line 8 connected thereto. The connecting line 6 and the venting line 8 each include a respective portion 9 of lesser stiffness.

LIST OF REFERENCES 1 fuel tank
2 venting arrangement
3 fuel vapor filter
4 filling connection
5 venting valves
6 connecting line
7 connecting portion
8 venting line
9 portion of lesser stiffness
10 portion of greater stiffness
11 fuel tank wall

The invention claimed is:

1. A fuel tank comprising:
a thermoplastic tank wall having an exterior filling connection;
an interior venting apparatus comprising:
a cylindrical connection portion;
a first pipe extending outward from the cylindrical connection portion, the first pipe comprising:
a deformable cylindrical section proximal to the cylindrical connection portion;
a distal line extending outward from the deformable cylindrical section of the first pipe to a venting valve at a distal end;
a proximal line extending from the connection portion to the deformable cylindrical section of the first pipe;
wherein the distal line of the first pipe is distal to the cylindrical connection portion and the proximal line of the first pipe is proximal to the cylindrical connection portion;
a second pipe extending outward from the cylindrical connection portion, the second pipe comprising:
a deformable cylindrical section proximal to the cylindrical connection portion;
a distal line extending outward from the deformable cylindrical section of the second pipe to a venting valve at a distal end;
a proximal line extending from the connection portion to the deformable cylindrical section of the second pipe;
wherein the distal line of the second pipe is distal to the cylindrical connection portion and the proximal line of the second pipe is proximal to the cylindrical connection portion;
wherein the deformable cylindrical section of the first pipe and the deformable cylindrical section of the second pipe are both a first polymer having a Shore A hardness of less than 70;
wherein the distal line of the first pipe, the distal line of the second pipe, the proximal line of the first pipe, and the proximal line of the second pipe are all a second polymer having a Shore A hardness of greater than 70.

2. The fuel tank as set forth in claim 1, characterized in that the second polymer is silicone.

3. The fuel tank as set forth in claim 1, characterized in that the first polymer is silicone.

4. The fuel tank as set forth in claim 1, the venting apparatus further comprising at least one functional component connected to the venting valve of the first pipe and the venting valve of the second pipe via a distributor portion in a connecting line.

5. The fuel tank as set forth in claim 4, characterized in that the connecting line comprises at least one deformable cylindrical section made from the first polymer.

6. The fuel tank as set forth in claim 1, the fuel tank further comprising:
a third pipe extending outward from the cylindrical connection portion, the third pipe comprising:
a deformable cylindrical section proximal to the cylindrical connection portion;
a distal line extending outward from the deformable cylindrical section of the third pipe to a venting valve at a distal end;
a proximal line extending from the cylindrical connection portion to the deformable cylindrical section of the third pipe;
wherein the distal line of the third pipe is distal to the cylindrical connection portion and the proximal line of the third pipe is proximal to the cylindrical connection portion.

7. The fuel tank as set forth in claim 6, characterized in that the deformable cylindrical section of the third pipe is the first polymer.

8. The fuel tank as set forth in claim 6, characterized in that the distal line of the third pipe and the proximal line of the third pipe are both the second polymer.

* * * * *